US009581181B2

(12) United States Patent
Despins et al.

(10) Patent No.: US 9,581,181 B2
(45) Date of Patent: Feb. 28, 2017

(54) SEAMING TAPE AND METHOD FOR USING SAME

(71) Applicant: Omnimart Distributions Inc., Edmonton (CA)

(72) Inventors: Maurice L. Despins, Edmonton (CA); David L. Despins, Edmonton (CA)

(73) Assignee: Omnimart Distributions Inc., Edmonton, AB (CA)

( * ) Notice: Subject to any disclaimer, the term of this patent is extended or adjusted under 35 U.S.C. 154(b) by 315 days.

(21) Appl. No.: 14/568,213

(22) Filed: Dec. 12, 2014

(65) Prior Publication Data

US 2015/0083323 A1 Mar. 26, 2015

Related U.S. Application Data

(62) Division of application No. 13/039,662, filed on Mar. 3, 2011, now abandoned.

(60) Provisional application No. 61/310,539, filed on Mar. 4, 2010.

(51) Int. Cl.
| | |
|---|---|
| *A47G 27/04* | (2006.01) |
| *B29C 65/52* | (2006.01) |
| *B32B 17/02* | (2006.01) |
| *B32B 29/02* | (2006.01) |
| *F16B 5/00* | (2006.01) |
| *B29C 65/00* | (2006.01) |
| *B32B 17/06* | (2006.01) |
| *B32B 3/26* | (2006.01) |
| *F16B 2/00* | (2006.01) |
| *B29L 31/00* | (2006.01) |

(52) U.S. Cl.
CPC ........... *F16B 5/0004* (2013.01); *A47G 27/045* (2013.01); *A47G 27/0487* (2013.01); *B29C 65/52* (2013.01); *B29C 66/1122* (2013.01); *B29C 66/1142* (2013.01); *B32B 3/266* (2013.01); *B32B 17/02* (2013.01); *B32B 17/065* (2013.01); *B32B 29/02* (2013.01); *F16B 2/00* (2013.01); *B29L 2031/7652* (2013.01); *B32B 2250/02* (2013.01); *Y10T 156/1798* (2015.01); *Y10T 428/2476* (2015.01)

(58) Field of Classification Search
CPC A47G 27/04; A47G 27/0437; A47G 27/0443; A47G 27/045; A47G 27/0475; A47G 27/0481; A47G 27/0487; B29C 65/48; B29C 65/52; B29C 65/524; B29C 66/1122; B29C 66/1142; B29L 2031/7322; B29L 2031/7652; B32B 17/02; B32B 17/065; B32B 29/02; B32B 2250/02; E04F 21/20; E04F 21/22; Y10T 156/1798

See application file for complete search history.

(56) References Cited

U.S. PATENT DOCUMENTS

| | | |
|---|---|---|
| 2,314,523 A | 3/1943 | Speer |
| 2,782,506 A | 2/1957 | Ingram |
| 2,890,145 A | 6/1959 | Milnes |

(Continued)

*Primary Examiner* — Michael Tolin
(74) *Attorney, Agent, or Firm* — J. Jay Haugen; Dentons Canada LLP

(57) ABSTRACT

A seaming tape for joining pieces of floor-covering together, such as carpet or resilient floor covering material, and a method for using the same to join adjacent pieces of planar material is provided. The seaming tape can include an upper mesh tape portion and a lower blocking tape portion that is narrower in width than the mesh tape portion. The mesh tape portion can further include a pressure-sensitive adhesive to hold the blocking tape portion in position.

13 Claims, 5 Drawing Sheets

(56) References Cited

U.S. PATENT DOCUMENTS

| | | | |
|---|---|---|---|
| 3,256,129 | A | 6/1966 | Wallerstein et al. |
| 3,485,704 | A | 12/1969 | Clymin |
| 3,533,876 | A | 10/1970 | Burgess |
| 3,972,768 | A | 8/1976 | Hill |
| 4,613,396 | A | 9/1986 | Scarborough |
| 4,901,419 | A | 2/1990 | Voss |
| 5,104,475 | A | 4/1992 | Foster et al. |
| 5,250,145 | A | 10/1993 | Despins et al. |
| 5,824,175 | A | 10/1998 | Hoopengardner |
| 6,110,565 | A | 8/2000 | Matthews |
| 6,997,227 | B2 | 2/2006 | Despins et al. |
| 7,381,289 | B2 | 6/2008 | Despins et al. |
| 2008/0034694 | A1 | 2/2008 | Banta |

SEAMING TAPE AND METHOD FOR USING SAME

CROSS REFERENCE TO RELATED APPLICATIONS

The present application is a division of U.S. patent application Ser. No. 13/039,662, filed Mar. 3, 2011, now abandoned, which claims priority benefit of U.S. provisional patent application Ser. No. 61/310,539, filed Mar. 4, 2010, and hereby incorporates the same applications herein by reference in their entirety.

TECHNICAL FIELD

The present disclosure is related to the field of seaming tapes, in particular, seaming tapes used in the seaming of planar materials, such as floor-coverings including carpet, resilient flooring material and the like.

BACKGROUND

There is a need for a seaming tape for use in joining floor-coverings with liquid or thermoplastic seaming adhesives that prevents the intermingling of the seaming adhesives used to join pieces of floor-coverings with adhesive used to glue the floor-covering to a floor.

SUMMARY

A seaming tape is provided that, in one embodiment, comprises an open mesh tape that overlays a strip of solid blocking tape that is narrower in width than the width of the mesh tape. In another embodiment, the mesh tape can be comprised of fiberglass mesh further comprising a plurality of openings approximately ⅛" square. In a further embodiment, the mesh tape can comprise a pressure-sensitive adhesive. In yet another embodiment, the blocking tape can be comprised of coated paper that can be disposed on the mesh tape and held in place by the pressure-sensitive adhesive disposed on the mesh tape.

In application and use, the seaming tape can be used to join adjacent pieces of floor-covering that can "float" on a floor, or that can be glued to the floor using floor adhesive. In the latter example where floor adhesive is used to glue the floor-covering to the floor, the seaming tape is placed on the floor with the blocking tape portion disposed between the floor and the mesh tape portion. The pieces of floor-covering to be joined can then be placed adjacent to each other on top of the seaming tape and then glued together using seaming adhesive dispensed by a seaming adhesive applicator tip, as well known to those skilled in the art. For the purposes of this specification, the term "seaming adhesive" can comprise liquid adhesives, thermoplastic adhesives (such as hot-melt glue) and any other form of adhesives used in the seaming of floor-covering materials as well known to those skilled in the art.

As seaming adhesive is dispensed between and underneath the edges of the pieces of floor-covering being joined together, the seaming adhesive can permeate the openings of the mesh tape. The blocking tape can act as a barrier to prevent the seaming adhesive from passing through the mesh tape. The blocking tape can also act to prevent the seaming adhesive and the floor adhesive from intermingling together, which can prevent the seaming adhesive from properly bonding the pieces of floor-covering together.

Incorporated by reference into this application are the within applicant's U.S. Pat. No. 5,250,145 issued on Oct. 5, 1993; U.S. Pat. No. 6,997,227 issued on Feb. 14, 2006; and U.S. Pat. No. 7,381,289 issued on Jun. 3, 2008.

Broadly stated, in some embodiments, a seaming tape is provided, comprising: a mesh tape portion; and a blocking tape portion disposed beneath the mesh tape portion, the blocking tape portion being narrower in width than the width of the mesh tape portion.

Broadly stated, in some embodiments, a method is provided for seaming abutting side-by-side layers of planar material, the method comprising the steps of: fitting abutting edges of the abutting layers of planar material to one another to form a line of abutment; placing a length of seaming tape underneath the planar material along the line of abutment, the seaming tape further comprising a mesh tape portion and a blocking tape portion disposed beneath the mesh tape portion, the width of the blocking tape portion being narrower than the width of the mesh tape portion; dispensing seaming adhesive along one or both of the abutting edges and onto a top surface of the seaming tape abutting the planar material; and pressing the abutting edges of the abutting layers of planar material against each other and against the tape until the seaming adhesive has at least partially set so as to form a finished seam along the line of abutment.

Broadly stated, in some embodiments, a kit is provided for seaming abutting side-by-side layers of planar material, the kit comprising: a length of seaming tape, further comprising: a mesh tape portion, and a blocking tape portion disposed beneath the mesh tape portion, the width of the blocking tape portion being narrower than the width of the mesh tape portion.

Broadly stated, in some embodiments, a method is provided for seaming abutting side-by-side layers of planar material on an installation surface, the method comprising the steps of: placing or installing one of the side-by-side layers of the planar material; marking a guide line along an abutting edge of the placed or installed planar material on the installation surface; placing a length of seaming tape underneath the placed or installed planar material along the guide line, the seaming tape further comprising a mesh tape portion and a blocking tape portion disposed beneath the mesh tape portion, the width of the blocking tape portion being narrower than the width of the mesh tape portion; placing or installing the other of the side-by-side layers of the planar material, and fitting abutting edges of the abutting layers of planar material to one another to form a line of abutment; dispensing seaming adhesive along one or both of the abutting edges, and dispensing adhesive onto a top surface of the seaming tape abutting the planar material; and pressing the abutting edges of the abutting layers of planar material against each other and against the tape until the adhesive has at least partially set so as to form a finished seam along the line of abutment.

DETAILED DESCRIPTION OF EMBODIMENTS

Figure 1:
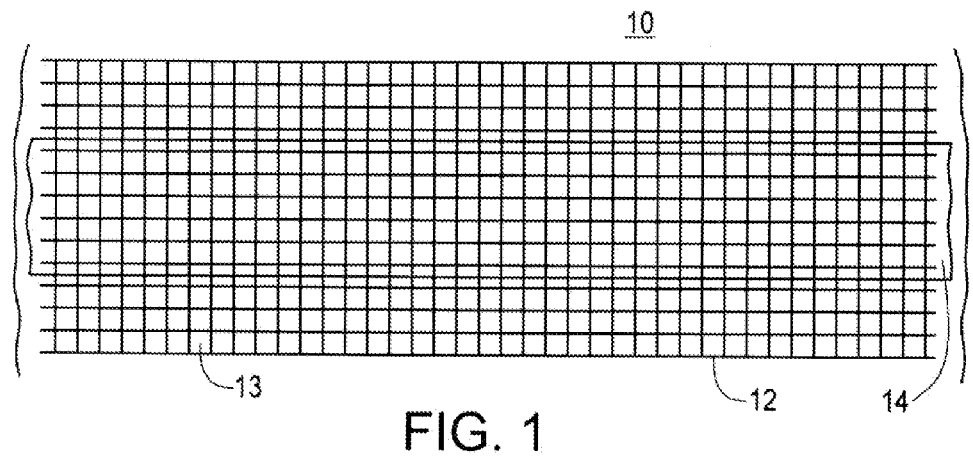
FIG. 1 is a top plan view depicting one embodiment of a seaming tape.
Figure 2:
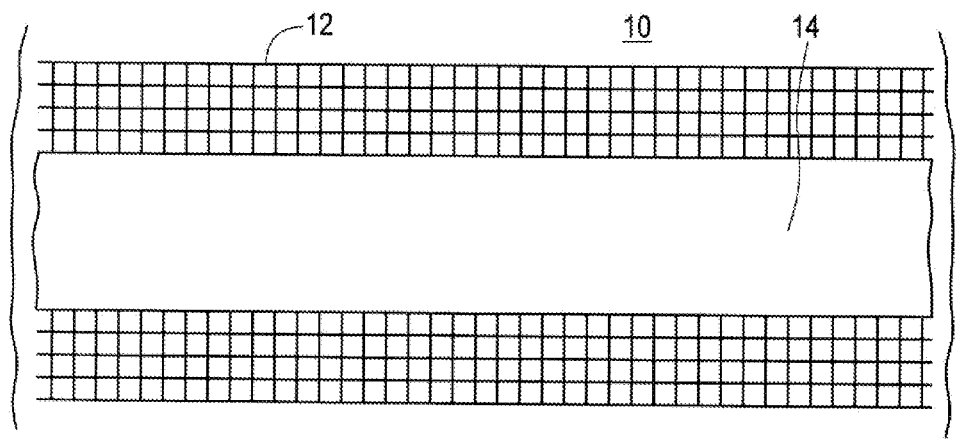
FIG. 2 is a bottom plan view depicting the seaming tape of FIG. 1.

Referring to FIGS. 1 and 2, one embodiment of seaming tape 10 is illustrated. In this embodiment, seaming tape 10 can comprise mesh tape portion 12 overlaid on blocking tape portion 14. In one embodiment, mesh tape portion 12 can be comprised of fiberglass mesh, such as the type used in the installation and repair of stucco although it is obvious to those skilled in the art that any suitable material for joining pieces of floor-covering together can be used for mesh tape portion 12, such as plastic mesh materials (including polypropylene and nylon mesh or webbing), textile materials (including fabrics and the like) or any other suitable materials known for reinforcing the seams between pieces of floor-covering materials.

In a representative embodiment, mesh tape portion 12 can have a width in the range of 2" to 3" although it is obvious to those skilled in the art that mesh tape portion 12 can be of any suitable width for joining adjacent pieces of floor-covering, whether that floor-covering is carpet or of resilient flooring material. In a further embodiment, mesh tape portion 12 can comprise a plurality of openings 13. In a representative embodiment, openings 13 are approximately ⅛" square although any suitable sized opening for receiving seaming adhesive can be used. In a further embodiment, mesh tape portion 12 can comprise a pressure-sensitive adhesive.

In yet another embodiment, blocking tape portion 14 can be comprised of coated paper that can be disposed on mesh tape portion 12. It is obvious to those skilled in the art that other materials can be used for blocking tape portion 14, which can include plastic tape and/or fabric and other suitable textile materials that can provide a barrier between a floor and mesh tape portion 12. In a representative embodiment, blocking tape portion 14 can be approximately 1" to 1½" wide although any suitable width can be used, as obvious to those skilled in the art, that is narrower in width than the width of mesh tape portion 12.

In one embodiment, blocking tape portion 14 can be held in place to mesh tape portion 12 by the pressure-sensitive adhesive disposed on mesh tape portion 12. It is obvious to those skilled in the art that seaming tape 10, when manufactured in volume, can be manufactured using mesh tape portion 12 that is not treated with a pressure-sensitive adhesive, and by applying a suitable adhesive between mesh tape portion 12 and blocking tape portion 14 and then sandwiching the tape portions together thereby bonding them together.

Figure 3:
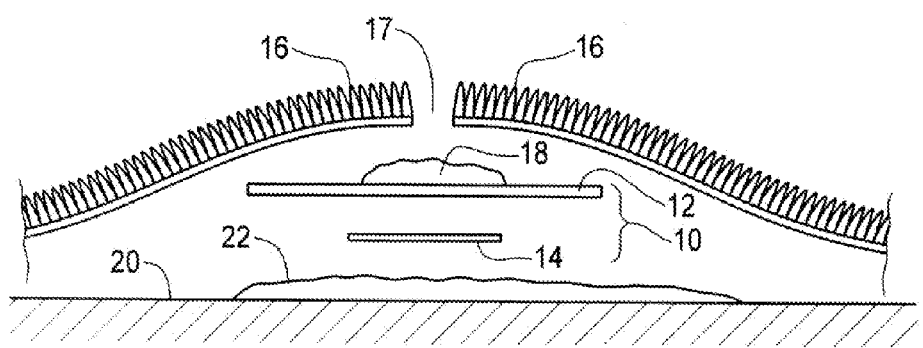
FIG. 3 is an exploded side elevation view depicting the seaming tape of FIG. 1 joining two pieces of floor-covering together.

Referring to FIG. 3, an exploded view of seaming tape 10 is shown in the seaming of two adjacent pieces of carpet 16 on floor 20. In this representative embodiment, seaming tape 10 is configured with mesh tape portion 12 facing up towards carpet 16, and blocking tape portion 14 facing down towards floor 20. Floor adhesive 22, as well known to those skilled in the art, is placed on floor 20. Seaming tape 10 is placed on top of floor adhesive 22 along the line where the adjacent pieces of carpet 16 will join together along seam 17. Seaming adhesive 18 can be applied between and beneath the edges of carpet 16 being joined together using a seaming adhesive applicator tip (not shown) as well known by those skilled in the art. Openings 13 in mesh tape portion 12 receive seaming adhesive 18 dispensed between the pieces of carpet 16 and aid in distributing the hot glue to carpet 16. Blocking portion 14, disposed beneath mesh tape portion 12 and above floor adhesive 22 acts as a barrier with at least two functions. A first function of blocking tape portion 14 is to prevent hot glue 18 from passing through openings 13 of mesh tape portion 12, thereby preventing full adhesion of seaming adhesive 18 to pieces of carpet 16. A second function of blocking tape portion 14 is to prevent the intermingling of floor adhesive 22 with seaming adhesive 18 that can prevent seaming adhesive 18 from fully bonding pieces of carpet 16 to each other.

Figure 4:
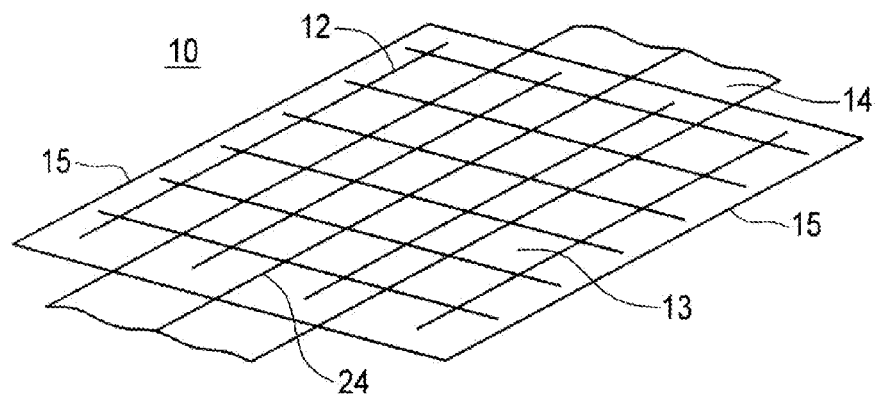
FIG. 4 is a top perspective view depicting an alternate embodiment of the seaming tape of FIG. 1.

Referring to FIG. 4, an alternate embodiment of seaming tape 10 is shown. In this embodiment, seaming tape 10 can further comprise center line 24 disposed on a top surface thereof. In some embodiments, center line 24 can be disposed along the length of seaming tape 10 substantially in the middle or centered between edges 15 of seaming tape 10. Center line 24 can provide means to visually guide an installer to place seaming tape 10 substantially centered underneath the gap between two pieces of floor-covering to be joined or seamed together. In some embodiments, center line 24 can be a solid line. In other embodiments, center line 24 can be a dashed or dotted line, or combinations thereof. In further embodiments, center line 24 can be a line of printed text, such as the manufacturer's name, the lot number or production run number, the date of manufacture, or any other text, or any other visual marking disposed substantially down the center of seaming tape 10 between edges 15 wherein center line 10 that can function as a visual guide to indicate the center of seaming tape 10.

In some embodiments, center line 24 can comprise a colored thread disposed in mesh tape portion 12. In other embodiments, center line 24 can be printed on blocking tape portion 14. In further embodiments, center line 24 can comprise painting or marking a line of paint or ink on mesh tape portion 12 or on blocking tape portion 14. In further embodiments, center line 24 can comprise a colored tape disposed on mesh tape portion 12 or between mesh tape portion 12 and blocking tape portion 14.

Figure 5:
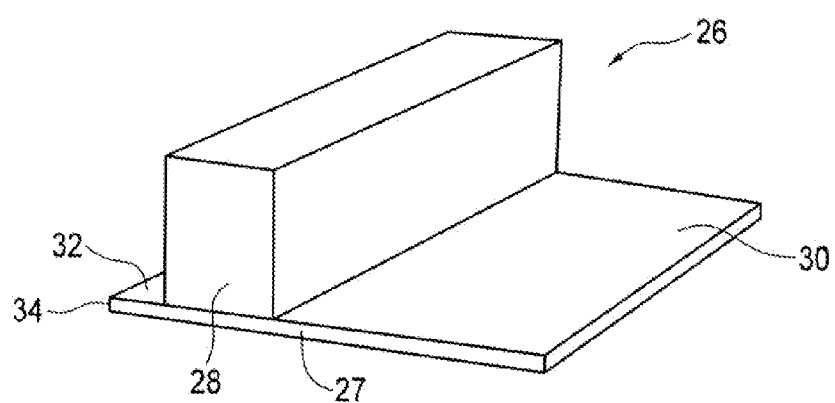
FIG. 5 is a top perspective view depicting a marking tool for use in the installation of the seaming tape of FIG. 1.

Referring to FIG. 5, marking tool 26 is shown, which can be used in the installation of seaming tape 10 when seaming pieces of floor-covering together. In some embodiments, marking tool 26 can comprise flat substrate 27 and stop 28 disposed on top thereof, thereby forming floor-covering side 30 and marking side 32 further comprising marking edge 34.

Figure 6:
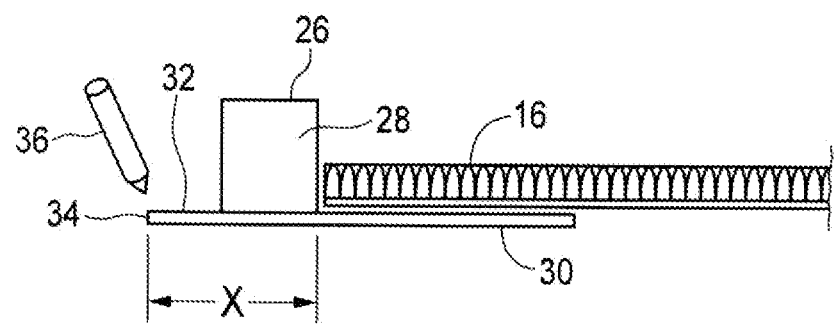
FIG. 6 is an end elevation view depicting the marking tool of FIG. 5 being used in the installation of the seaming tape of FIG. 1.

Referring to FIG. 6, marking tool 26 is shown being used with piece of carpet 16. Floor-covering side 30 of marking tool 26 can be placed underneath carpet 16 wherein carpet 16 abuts stop 28. In some embodiments, the dimension of marking side 32 can be selected wherein the distance "X", as shown in FIG. 6, is approximately the same as the lateral distance between center line 24 and edge 15 of seaming tape 10, as shown in FIG. 4.

When installing seaming tape 10 between abutting side-by-side layers of planar material, such as floor-coverings, carpet, etc., an installer can first place or install one of the side-by-side layers of the planar material. While the planar material is typically installed on a horizontal surface such as a floor or stair treads or other horizontal surfaces as obvious to those skilled in the art, the planar material can also be installed on non-horizontal surfaces as obvious to those skilled in the art. Upon installing the first piece of planar material to be seamed, such as carpet 16 shown in FIG. 6, the installer can run marking tool 26 along an abutting edge of carpet 16 while using marking pen or pencil 36 to draw a guide line along marking edge 34 on the floor adjacent to the abutting edge of carpet 16. Once a line has been drawn on an installation surface (the floor in the illustrated example shown in FIG. 6) along the edge of carpet 16, the drawn line can provide a visual guide to the installer as to where edge 15 of seaming tape 10 should lay underneath carpet 16 when seaming carpet 16 to another piece of carpet. In so doing, center line 24 should lay along the edge of carpet 16 where the seam is to be made to provide a visual guide to the installer that seaming tape 10 is properly positioned underneath carpet 16.

Figure 7:
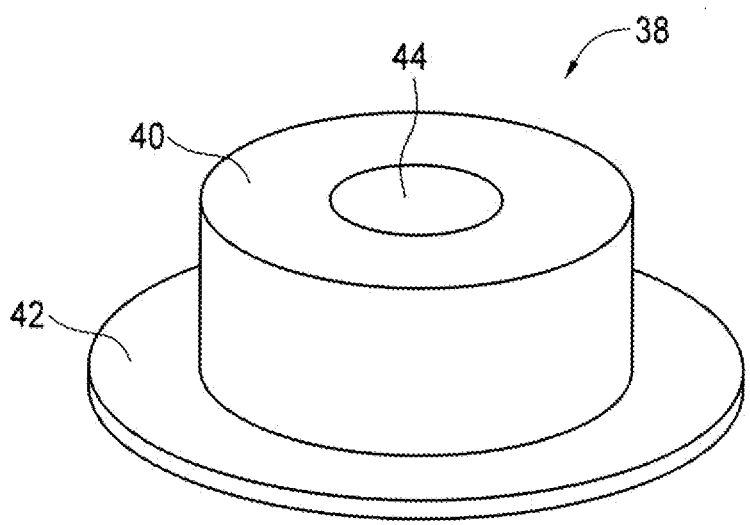
FIG. 7 is a top perspective view depicting a second embodiment of a marking tool for use in the installation of the seaming tape of FIG. 1.

Referring to FIG. 7, an alternate embodiment of a marking tool is shown for drawing a guide line. In some embodiments, marking tool 38 can comprise cylindrical portion 40 disposed on top of flange portion 42, with marking pen opening 44 extending therethrough. In some embodiments, the diameter of cylindrical portion 40 can be selected wherein its radius can be approximately distance "X" as shown in FIG. 6.

Figure 8:
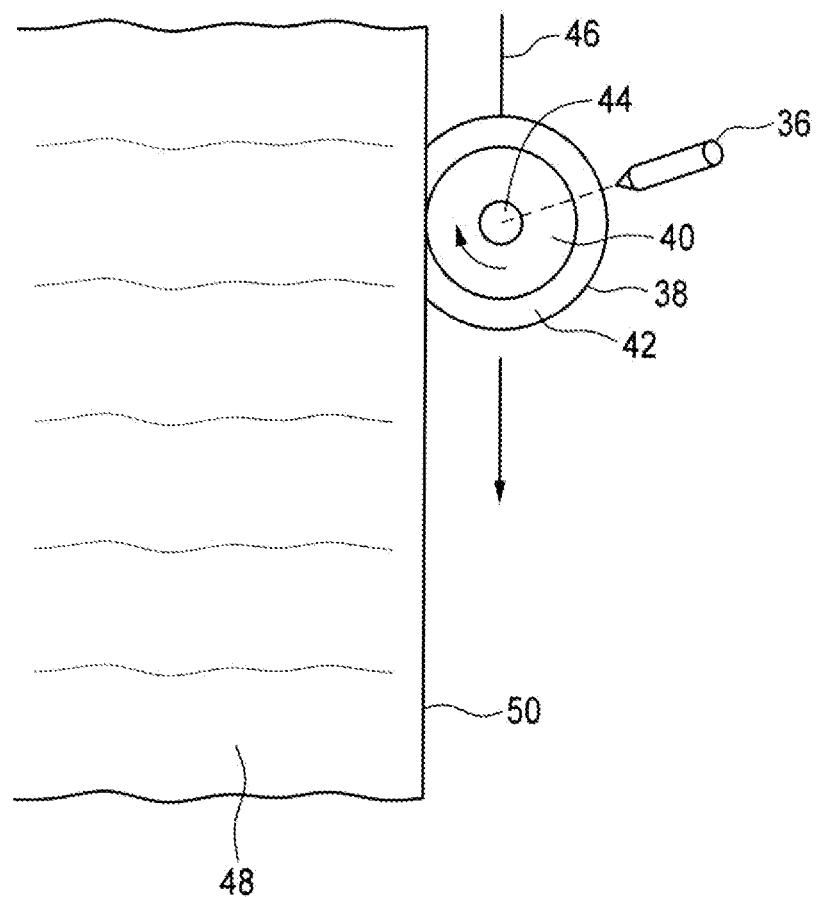
FIG. 8 is a top plan view depicting the marking tool of FIG. 7 being used in the installation of the seaming tape of FIG. 1.

Referring to FIG. 8, marking tool 38 is shown in use to mark guide line 46. Flange portion 42 can be placed under carpet 48 until cylindrical portion 40 abuts edge 50 of carpet 48. Marking pen 36 can be inserted through opening 44 to mark guide line 46 on the floor. An installer can then move marking tool 38 down along edge 50 whereby cylindrical portion 42 rolls along edge 50 resulting in marking pen 36 marking guide line 46 on the floor substantially parallel to edge 50.

In some embodiments, a kit is provided for seaming abutting side-by-side layers of planar material. The kit can comprise a length of seaming tape 10. In other embodiments, the kit can comprise a set of instructions explaining how seaming tape 10 can be used to seam abutting side-by-side layers of planar material. In further embodiments, the kit can comprise marking tool 26. In other embodiments, the kit can comprise marking tool 38. In yet further embodiments, the kit can further comprise a marking pen or pencil for use with marking tool 26 or marking tool 38.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

We claim:

1. A method of seaming abutting side-by-side layers of planar material, the method comprising the steps of:
   a) fitting abutting edges of the abutting layers of planar material to one another to form a line of abutment;
   b) placing a length of seaming tape underneath the planar material along the line of abutment, the seaming tape further comprising a mesh tape portion and a blocking tape portion disposed beneath the mesh tape portion, the width of the blocking tape portion being narrower than the width of the mesh tape portion;
   c) dispensing seaming adhesive along one or both of the abutting edges and dispensing adhesive onto a top surface of the seaming tape abutting the planar material, wherein the blocking tape portion acts as a barrier to prevent the seaming adhesive from passing therethrough; and
   d) pressing the abutting edges of the abutting layers of planar material against each other and against the tape until the adhesive has at least partially set so as to form a finished seam along the line of abutment.

2. The method as set forth in claim 1, wherein the mesh tape portion is comprised of fiberglass mesh tape.

3. The method as set forth in claim 2, wherein the fiberglass mesh tape further comprises a pressure-sensitive adhesive disposed thereon.

4. The method as set forth in claim 3, wherein the pressure-sensitive adhesive holds the blocking tape portion to the mesh tape portion.

5. The method as set forth in claim 1, wherein the blocking tape portion is comprised of coated paper.

6. The method as set forth in claim 1, wherein the seaming tape further comprises a center line disposed thereon.

7. A method of seaming abutting side-by-side layers of planar material on an installation surface, the method comprising the steps of:
   a) placing or installing one of the side-by-side layers of the planar material;
   b) marking a guide line along an abutting edge of the placed or installed planar material on the installation surface;
   c) placing a length of seaming tape underneath the placed or installed planar material along the guide line, the seaming tape further comprising a mesh tape portion and a blocking tape portion disposed beneath the mesh tape portion, the width of the blocking tape portion being narrower than the width of the mesh tape portion;
   d) placing or installing the other of the side-by-side layers of the planar material, and fitting abutting edges of the abutting layers of planar material to one another to form a line of abutment;
   e) dispensing seaming adhesive along one or both of the abutting edges, and dispensing adhesive onto a top surface of the seaming tape abutting the planar material, wherein the blocking tape portion acts as a barrier to prevent the seaming adhesive from passing therethrough; and
   f) pressing the abutting edges of the abutting layers of planar material against each other and against the tape until the adhesive has at least partially set so as to form a finished seam along the line of abutment.

8. The method as set forth in claim 7, wherein the guide line is marked using a marking tool.

9. The method as set forth in claim 7, wherein the mesh tape portion is comprised of fiberglass mesh tape.

10. The method as set forth in claim 9, wherein the fiberglass mesh tape further comprises a pressure-sensitive adhesive disposed thereon.

11. The method as set forth in claim 10, wherein the pressure-sensitive adhesive holds the blocking tape portion to the mesh tape portion.

12. The method as set forth in claim 7, wherein the blocking tape portion is comprised of coated paper.

13. The method as set forth in claim 7, wherein the seaming tape further comprises a center line disposed thereon.

* * * * *